US012643554B2

(12) United States Patent
Tanaka et al.

(10) Patent No.: US 12,643,554 B2
(45) Date of Patent: Jun. 2, 2026

(54) DRIVER STATE ESTIMATION APPARATUS

(71) Applicant: Mazda Motor Corporation, Hiroshima (JP)

(72) Inventors: Kengo Tanaka, Aki-gun (JP); Satoru Takenaka, Aki-gun (JP); Koji Iwase, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 16 days.

(21) Appl. No.: 19/040,864

(22) Filed: Jan. 30, 2025

(65) Prior Publication Data

US 2025/0263082 A1     Aug. 21, 2025

(30) Foreign Application Priority Data

Feb. 15, 2024     (JP) ................................. 2024-021281

(51) Int. Cl.
B60W 40/09        (2012.01)
B60W 30/09        (2012.01)
B60W 30/095       (2012.01)
B60W 50/00        (2006.01)
B60W 50/14        (2020.01)

(52) U.S. Cl.
CPC ........ B60W 40/09 (2013.01); B60W 30/0956 (2013.01); B60W 50/0097 (2013.01); B60W 50/14 (2013.01); B60W 2540/225 (2020.02); B60W 2540/229 (2020.02)

(58) Field of Classification Search
None
See application file for complete search history.

(56) References Cited

U.S. PATENT DOCUMENTS

| | | | | |
|---|---|---|---|---|
| 2020/0216078 A1* | 7/2020 | Katz | ..................... | B60W 40/09 |
| 2021/0182609 A1* | 6/2021 | Arar | .......................... | G06N 3/08 |
| 2021/0357670 A1* | 11/2021 | Wu | ......................... | G06V 20/56 |
| 2021/0394775 A1* | 12/2021 | Julian | ................... | B60W 50/14 |
| 2024/0067182 A1* | 2/2024 | Persson | ................. | B60W 50/14 |

FOREIGN PATENT DOCUMENTS

| | | |
|---|---|---|
| JP | 6958886 B2 | 11/2021 |
| JP | 7164275 B2 | 11/2022 |

* cited by examiner

*Primary Examiner* — Abdhesh K Jha
(74) *Attorney, Agent, or Firm* — XSENSUS LLP

(57)        ABSTRACT
A driver state estimation apparatus includes a controller to estimate the driver's state based on travel environment and the driver's line of sight. The controller calculates a predicted gazing frequency of the driver to gaze at a cautionary object based on a relative risk, an observable time, and a speed of the vehicle, calculates a predicted gazing time in which the driver continuously gazes at the cautionary object, acquires a measured value of each of a gazing frequency and a gazing time, calculates an abnormality level of the driver based on a product of a difference between the actual measured value and the predicted value of the gazing frequency and a difference between the actual measured value and the predicted value of the gazing time, and estimates that the driver is in an inattentive state when the abnormality level is equal to or greater than a predetermined threshold.

20 Claims, 4 Drawing Sheets

DRIVER STATE ESTIMATION APPARATUS

CROSS-REFERENCE TO RELATED APPLICATION

The present application claims priority from the Japanese patent application JP 2024-021281, filed on Feb. 15, 2024, the entire content of which is incorporated herein by reference in its entirety.

TECHNICAL FIELD

The present disclosure relates to a driver state estimation apparatus that estimates a state of a driver who drives a vehicle.

BACKGROUND

One of the main causes of traffic accidents is a state where concentration of a driver on driving is lacking, that is, a so-called inattentive state. Conventionally, the following techniques are proposed as techniques for detecting the inattentive state, and the techniques include: a technique for estimating the driver's concentration state on driving on the basis of a ratio of a state where the driver is gazing at a forward gazing point, a state where the driver is gazing at a driving gazing point, and a state where the driver is gazing at a non-driving gazing point as well as duration of gazing (for example, see Patent Literature 1); a technique for estimating that the current driver is in a reduced attention state in the case where a time constant of a driver model that represents a time delay of gazing point movement is larger than a time constant of the driver model of the driver in the past and a time constant of a normative driver model (for example, see Patent Literature 2); and the like.

CITATION LIST

Patent Literature

[Patent Literature 1] Japanese Patent No. 7,164,275
[Patent Literature 2] Japanese Patent No. 6,958,886

SUMMARY

Technical Problems

However, in the conventional technique as described above, differences in travel environment such as a vehicle speed and a surrounding congestion situation are not taken into consideration, and the driver's state is uniformly estimated in any travel environment. Accordingly, the driver may be erroneously determined to be in the inattentive state when the travel environment is significantly changed, such as when the vehicle enters an expressway from an ordinary road.

The disclosure has been made to solve such problems and includes a driver state estimation apparatus capable of accurately estimating that a driver is in an inattentive state regardless of a travel environment.

Solutions to Problems

In order to solve the above-described problem, the disclosure describes a driver state estimation apparatus that estimates a state of a driver who drives a vehicle, the apparatus including: a travel environment information acquisition device that acquires travel environment information of the vehicle; a line-of-sight detection device that detects the driver's line of sight; and a controller configured to estimate the driver's state on the basis of the travel environment information and the driver's line of sight. The controller is configured to: calculate a relative risk that represents a risk of the vehicle to collide with a cautionary object around the vehicle on the basis of the travel environment information; calculate an observable time that represents a time in which the cautionary object has existed at a position where the driver can gaze the cautionary object, on the basis of the travel environment information; calculate a predicted gazing frequency value that represents the number of times the driver gazes at the cautionary object during a predetermined observation time on the basis of the relative risk, the observable time, and a speed of the vehicle; calculate a predicted gazing time value in which the driver continuously gazes at the cautionary object during the predetermined observation time on the basis of the observable time; acquire an actual measured value of each of a gazing frequency and a gazing time of the driver gazing at the cautionary object during the predetermined observation time on the basis of the travel environment information and the driver's line of sight; calculate an abnormality level of the driver on the basis of a product of a difference between an actual measured value and the predicted value of the gazing frequency and a difference between an actual measured value and the predicted value of the gazing time; and estimate that the driver is in an inattentive state in the case where the abnormality level is equal to or greater than a predetermined threshold.

According to the disclosure, the controller calculates the predicted gazing frequency value on the basis of the relative risk, the observable time, and the speed of the vehicle, calculates the predicted gazing time value on the basis of the observable time, and estimates that the driver is in the inattentive state in the case where the driver's abnormality level, which is calculated on the basis of the product of the difference between the actual measured value and the predicted value of the gazing frequency and the difference between the actual measured value and the predicted value of the gazing time, is equal to or greater than the predetermined threshold. Thus, it is possible to predict the gazing frequency and the gazing time of the driver in a normal state with a high degree of accuracy by reflecting an influence of travel environment on the gazing frequency and the gazing time, and it is thus possible to accurately estimate the driver's state on the basis of the difference of each of the gazing frequency and the gazing time from the actual measured value. In this way, it is possible to accurately estimate that the driver is in the inattentive state regardless of the travel environment.

In the disclosure, preferably, the controller is configured to: identify a type of the cautionary object on the basis of the travel environment information; calculate the abnormality level for each type of the cautionary object; calculate an integrated abnormality level by synthesizing the abnormality levels, each of which is calculated for each type of the cautionary object; and estimate that the driver is in the inattentive state in the case where the integrated abnormality level is equal to or greater than a predetermined threshold.

According to the disclosure, the controller calculates the integrated abnormality level by synthesizing the abnormality levels, each of which is calculated for each type of the cautionary object, and estimates that the driver is in the inattentive state in the case where the integrated abnormality level is equal to or greater than the predetermined threshold.

Thus, even in the case where a different systematic error is included in the predicted value of each of the gazing frequency and the gazing time depending on the type of the cautionary object, the driver's state can be estimated by using the abnormality level, which is calculated for each type of the cautionary object such that the plural systematic errors are not superimposed, and it is thus possible to further accurately estimate that the driver is in the inattentive state.

In the disclosure, preferably, the types of the cautionary objects include a preceding vehicle, a side vehicle, and an unidentified object.

According to the disclosure, even in the case where the different systematic error is included in the predicted value of each of the gazing frequency and the gazing time for each of the preceding vehicle, the side vehicle, and the unidentified object, the controller can estimate the driver's state by using the abnormality level, which is individually calculated for each of the preceding vehicle, the side vehicle, and the unidentified object, such that those plural systematic errors are not superimposed, and it is thus possible to further accurately estimate that the driver is in the inattentive state.

Advantage Effects

According to the driver state estimation apparatus of the disclosure, it is possible to estimate that the driver is in the inattentive state regardless of the travel environment.

DETAILED DESCRIPTION

Hereinafter, a driver state estimation apparatus according to an exemplary embodiment of the disclosure will be described with reference to the accompanying drawings.

System Configuration

Figure 1:
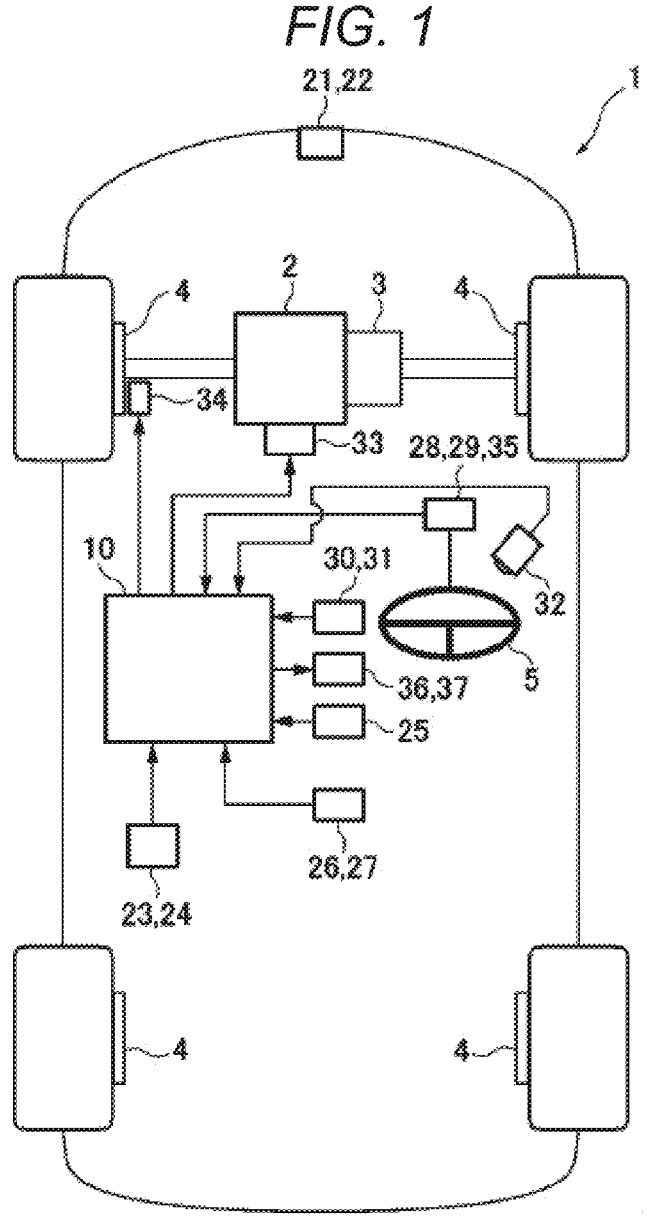
FIG. 1 is a view illustrating a vehicle on which a driver state estimation apparatus according to an exemplary embodiment of the disclosed subject matter is mounted.
Figure 2:
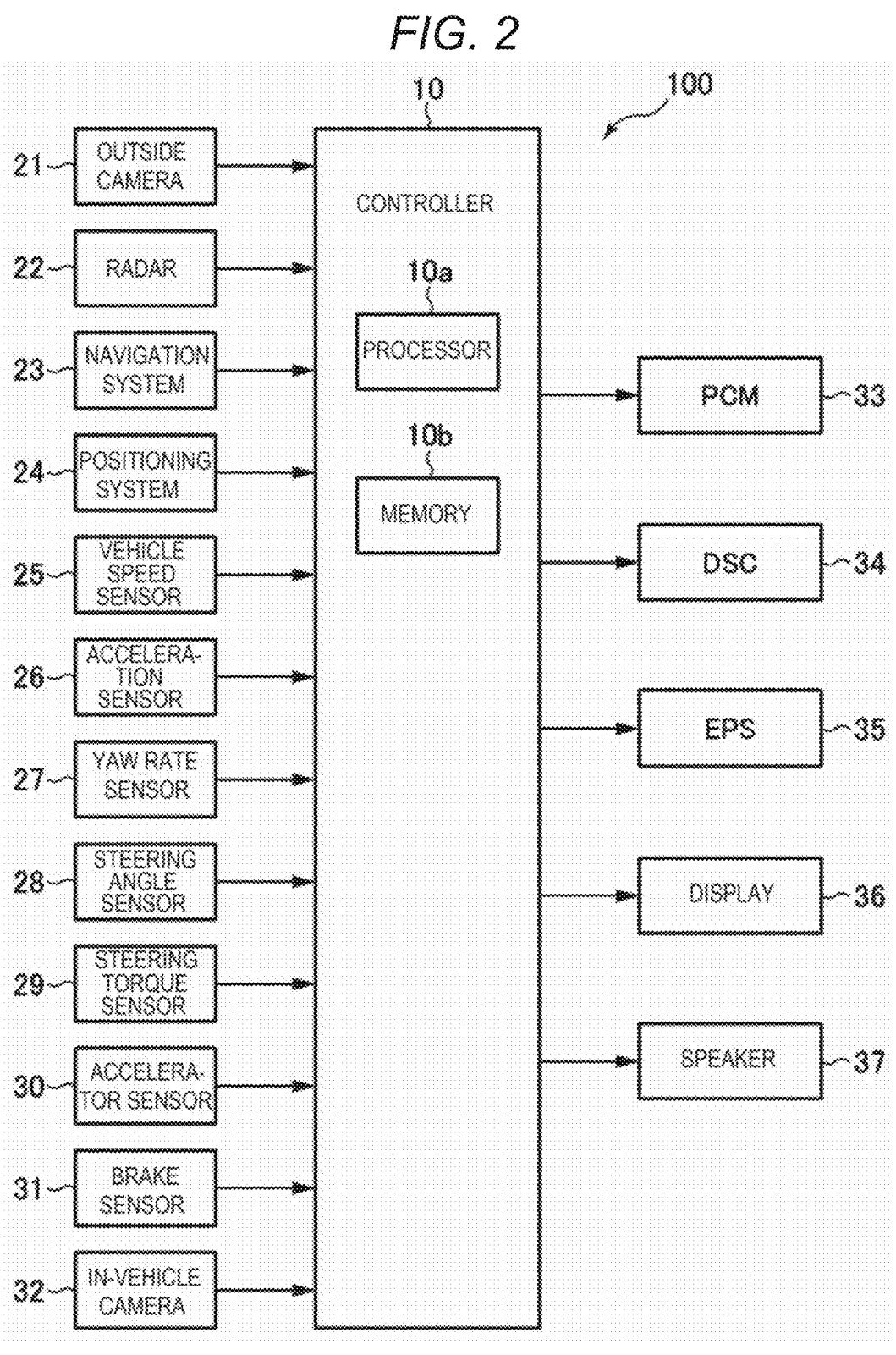
FIG. 2 is a block diagram of the driver state estimation apparatus according to an exemplary embodiment of the disclosed subject matter.

First, a configuration of the driver state estimation apparatus according to the present embodiment will be described with reference to FIGS. 1 and 2. FIG. 1 is a view illustrating a vehicle on which the driver state estimation apparatus is mounted, and FIG. 2 is a block diagram of the driver state estimation apparatus.

A vehicle 1 according to the present embodiment includes: a driving force source 2, such as an engine or an electric motor, that outputs a driving force; a transmission 3 that transmits the driving force output from the driving force source 2 to drive wheels; a brake 4 that applies a braking force to the vehicle 1; and a steering device 5 for steering the vehicle 1.

A driver state estimation apparatus 100 is configured to estimate a state of a driver of the vehicle 1 and execute control of the vehicle 1 and driver assistance control when necessary. As illustrated in FIG. 2, the driver state estimation apparatus 100 includes a controller 10, a plurality of sensors, a plurality of control systems, and a plurality of information output devices.

More specifically, the plurality of sensors includes an outside camera 21 and a radar 22 for acquiring travel environment information of the vehicle 1, and a navigation system 23 and a positioning system 24 for detecting a position of the vehicle 1. The plurality of sensors also includes a vehicle speed sensor 25, an acceleration sensor 26, a yaw rate sensor 27, a steering angle sensor 28, a steering torque sensor 29, an accelerator sensor 30, and a brake sensor 31 for detecting behavior of the vehicle 1 and a driving operation by the driver. The plurality of sensors further includes an in-vehicle camera 32 for detecting the driver's line of sight. The plurality of control systems includes a powertrain control module (PCM) 33 that controls the driving force source 2 and the transmission 3, a dynamic stability control system (DSC) 34 that controls the driving force source 2 and the brake 4, and an electric power steering system (EPS) 35 that controls the steering device 5. The plurality of information output devices includes a display 36 that outputs image information and a speaker 37 that outputs audio information.

Moreover, sensors may include: a peripheral sonar that measures a distance to and a position of a structure around the vehicle 1; corner radars, each of which measures approach of the peripheral structure at respective one of four corners of the vehicle 1; and various sensors, each of which detects the driver's state (for example, a heartbeat sensor, an electrocardiogram sensor, a steering wheel grip force sensor, and the like).

The controller 10 performs various calculations on the basis of signals received from the plurality of sensors, transmits, to the PCM 33, the DSC 34, and the EPS 35, control signals for appropriately actuating the driving force source 2, the transmission 3, the brake 4, and the steering device 5, and transmits, to the display 36 and the speaker 37, control signals for causing the display 36 and the speaker 37 to output desired information. The controller 10 is configured by a computer that includes one or more processors 10a (typically, CPUs), a memory 10b (such as ROM and RAM) for storing various programs and data, an input/output device, and the like.

The outside camera 21 captures an image of the surroundings of the vehicle 1 and outputs image data. The controller 10 recognizes an object (for example, a preceding vehicle, a parked vehicle, a pedestrian, a travel road, a division line (a lane boundary line, a white line, and a yellow line), a traffic signal, a traffic sign, a stop line, an intersection, an obstacle, and the like) on the basis of the image data received from the outside camera 21. In addition, the controller 10 can identify curvature of a road on which the vehicle 1 is traveling and illuminance outside the vehicle 1 on the basis of the image data received from the outside camera 21. The outside camera 21 corresponds to an example of the "travel environment information acquisition device" in the disclosure.

The radar 22 measures a position and a speed of the object (in particular, the preceding vehicle, the parked vehicle, the pedestrian, a dropped object on the travel road, and the like). A millimeter wave radar can be used as the radar 22, for example. The radar 22 transmits a radio wave in an advancing direction of the vehicle 1, and receives a reflected wave that is generated when the transmitted wave is reflected by the object. Then, the radar 22 measures a distance (for example, an inter-vehicle distance) between the vehicle 1 and the object and a relative speed of the object to the vehicle 1 on the basis of the transmitted wave and the received wave. In the present embodiment, instead of the radar 22, a laser radar, an ultrasonic sensor, or the like may be used to measure the distance to and the relative speed of the object. Alternatively, a plurality of sensors may be used to form a position and speed measurement device. The radar 22 corresponds to an example of the "travel environment information acquisition device" in the disclosure.

The navigation system 23 stores map information therein, and can provide the map information to the controller 10. The controller 10 identifies the road, the intersection, the traffic signal, a building, and the like that are present around (in particular, in the advancing direction of) the vehicle 1 on the basis of the map information and current vehicle position information. The controller 10 can also identify the curvature and a gradient of the road on which the vehicle 1 is traveling on the basis of the map information and the current vehicle position information. The map information may be stored in the controller 10. The positioning system 24 is a GPS system and/or a gyroscopic system, and detects the position of the vehicle 1 (the current vehicle position information).

The vehicle speed sensor 25 detects a speed of the vehicle 1 on the basis of a rotational speed of the wheel or a driveshaft, for example. The acceleration sensor 26 detects acceleration of the vehicle 1. This acceleration includes acceleration in a longitudinal direction of the vehicle 1 and acceleration in a lateral direction (that is, lateral acceleration) thereof. In addition, the controller 10 can identify the gradient of the road on which the vehicle 1 is traveling on the basis of the speed and the acceleration of the vehicle 1. In the present specification, the acceleration includes not only a change rate of the speed in a speed increasing direction but also a change rate of the speed in a speed reducing direction (that is, deceleration). The vehicle speed sensor 25 and the acceleration sensor 26 also correspond to examples of the "travel environment information acquisition device" in the disclosure.

The yaw rate sensor 27 detects a yaw rate of the vehicle 1. The steering angle sensor 28 detects a rotation angle (a steering angle) of a steering wheel of the steering device 5. The steering torque sensor 29 detects torque (steering torque) that is applied to a steering shaft via the steering wheel. The accelerator sensor 30 detects a depression amount of an accelerator pedal. The brake sensor 31 detects a depression amount of a brake pedal.

The in-vehicle camera 32 captures an image of the driver and outputs image data. The controller 10 detects the driver's line-of-sight direction on the basis of the image data received from the in-vehicle camera 32. The in-vehicle camera 32 corresponds to an example of the "line-of-sight detection device" in the disclosure.

The PCM 33 controls the driving force source 2 of the vehicle 1 to adjust the driving force of the vehicle 1. For example, the PCM 33 controls an ignition plug, a fuel injection valve, a throttle valve, and a variable valve mechanism of the engine, the transmission 3, an inverter that supplies electric power to the electric motor, and the like. When the vehicle 1 has to be accelerated or decelerated, the controller 10 transmits a control signal for adjusting the driving force to the PCM 33.

The DSC 34 controls the driving force source 2 and the brake 4 of the vehicle 1 and executes deceleration control and posture control of the vehicle 1. For example, the DSC 34 controls a hydraulic pump, a valve unit, and the like of the brake 4, and controls the driving force source 2 via the PCM 33. When the deceleration control or the posture control of the vehicle 1 has to be executed, the controller 10 transmits, to the DSC 34, a control signal for adjusting the driving force or generating the braking force.

The EPS 35 controls the steering device 5 of the vehicle 1. For example, the EPS 35 controls an electric motor that applies the torque to the steering shaft of the steering device 5, and the like. When the advancing direction of the vehicle 1 has to be changed, the controller 10 transmits a control signal for changing a steering direction to the EPS 35.

The display 36 is provided in front of the driver in a cabin, and shows the image information for the driver. A liquid crystal display or a head-up display is used as the display 36, for example. The speaker 37 is installed in the cabin and outputs various types of the audio information.

[Driver State Estimation Processing]

Figure 3:
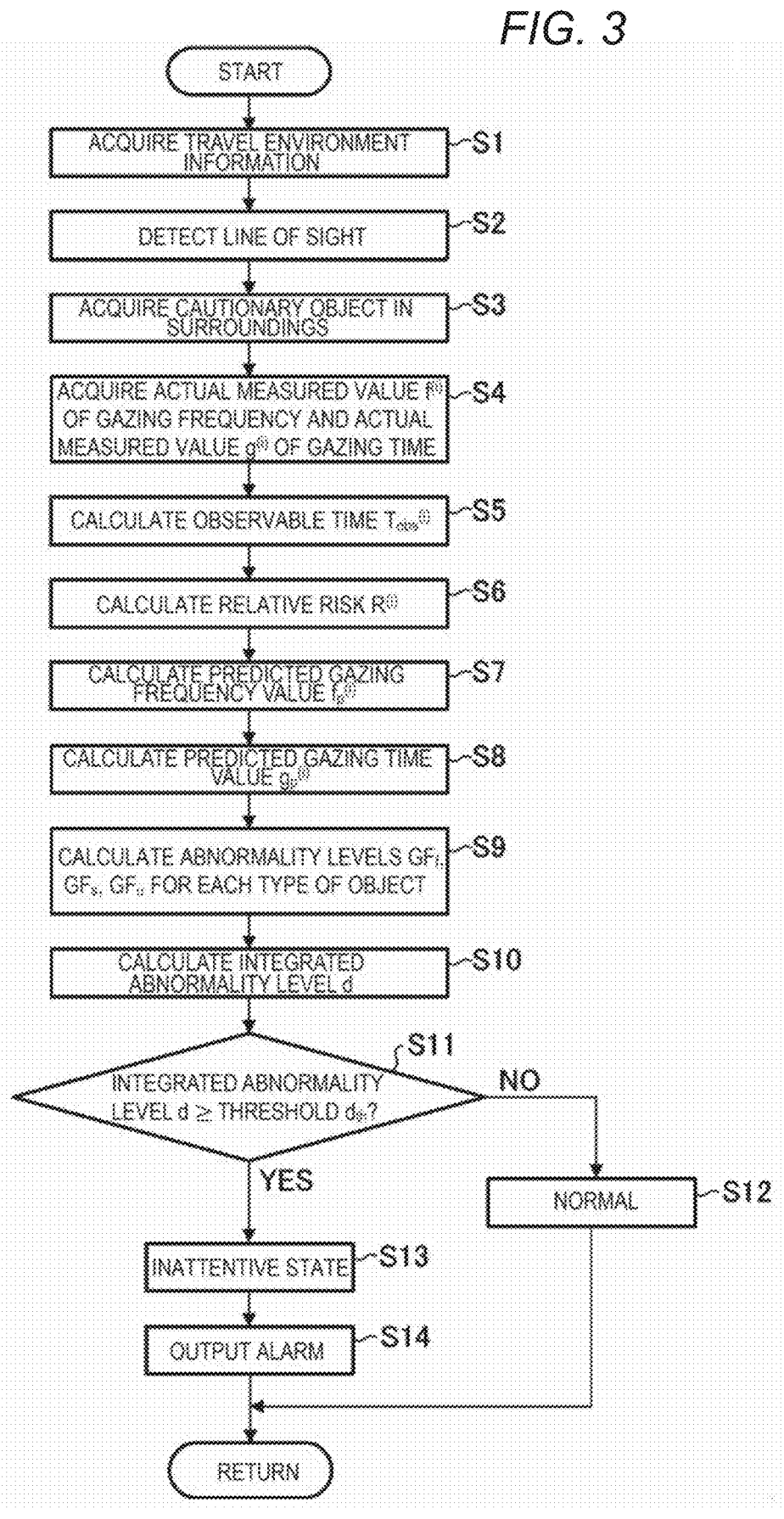
FIG. 3 is a flowchart of driver state estimation processing according to an exemplary embodiment of the disclosed subject matter.
Figure 4:
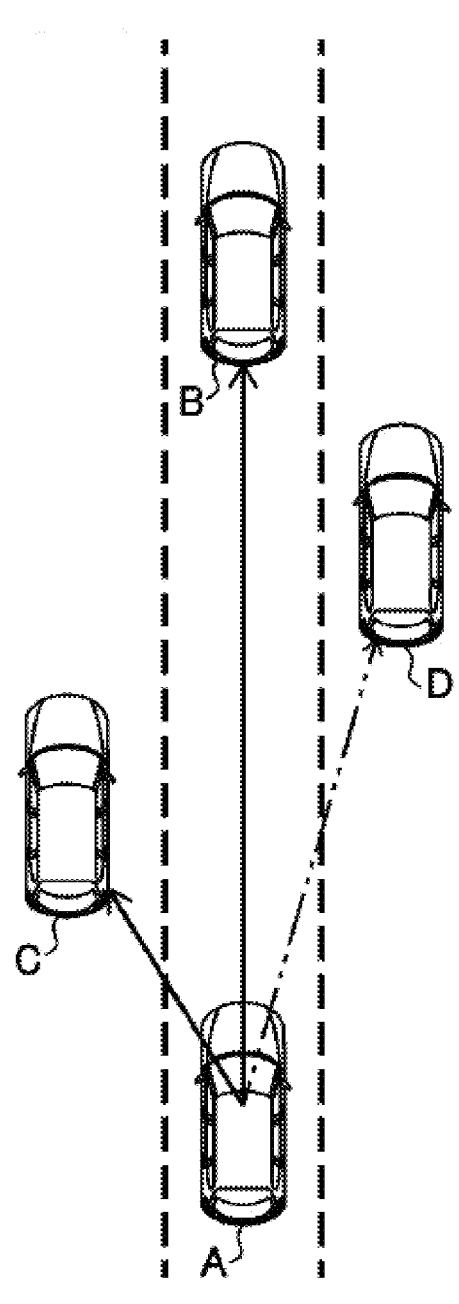
FIG. 4 is a conceptual view illustrating types of a cautionary object to which a driver directs his/her line of sight in an exemplary embodiment of the disclosed subject matter.

Next, driver state estimation processing by the driver state estimation apparatus 100 of the present embodiment will be described with reference to FIGS. 3 and 4. FIG. 3 is a flowchart of the driver state estimation processing to estimate whether the driver is in an inattentive state or normal. FIG. 4 is a conceptual view illustrating types of a cautionary object to which the driver directs his/her line of sight.

The driver state estimation processing is started when the vehicle 1 is powered on, and is repeatedly executed by the controller 10 in a predetermined cycle (for example, every 0.05 to 0.2 seconds).

When the driver state estimation processing is started, the controller 10 first acquires the travel environment information on the basis of the signals received from the sensors including the outside camera 21, the radar 22, the vehicle speed sensor 25, and the acceleration sensor 26 (step S1).

Next, the controller 10 detects the driver's line of sight on the basis of the signal received from the in-vehicle camera 32 (step S2).

Next, based on the travel environment information acquired in step S1, the controller 10 acquires the object (cautionary object), to which the driver should pay attention, around the vehicle 1 (step S3). In the driver state estimation processing of the present embodiment, another vehicle is used as the cautionary object.

Next, based on the driver's line of sight detected in step S2 and the cautionary object acquired in step S3, the controller 10 acquires an actual measured value $f^{(i)}$ of a gazing frequency and an actual measured value $g^{(i)}$ of a gazing time to each cautionary object i in the last observation time (for example, 10 seconds) (step S4). More specifically, in the case where a direction of the line of sight with the driver's head position being a reference overlaps a direction of the cautionary object for a predetermined time (for example, 0.1 second) or longer on the basis of the direction of the driver's line of sight, which is identified on the basis of the image acquired from the in-vehicle camera 32, and a position of the cautionary object acquired by the outside camera 21 or the radar 22, the controller 10 determines that the driver gazes at the cautionary object. In addition, the actual measured value $f^{(i)}$ of the gazing frequency is the number of times that the driver has been shifted from a state of not gazing at the cautionary object i to a state of gazing at the cautionary object i within the last observation time (for example, 10 seconds). Furthermore, the actual measured value $g^{(i)}$ of the gazing time is a maximum value or an average value of the time during which the driver continuously gazes at the cautionary object i in the last observation time (for example, 10 seconds). The controller 10 accumulates the actual measured value $f^{(i)}$ of the acquired gazing frequency and the actual measured value $g^{(i)}$ of the gazing time in the memory 10b.

Next, the controller 10 calculates an observable time $T_{obs}^{(i)}$ of each of the cautionary objects i on the basis of the travel environment information acquired in step S1 (step S5). The observable time $T_{obs}^{(i)}$ is a time in which the cautionary object i has existed at a position capable of being gazed at by the driver in the last observation time (for example, 10 seconds). For example, the controller 10 calculates, as the observable time $T_{obs}^{(i)}$, a time in which the cautionary object i has existed within a predetermined angular range (for example, within 80 deg in a left-right direction and within 50 deg in an up-down direction) from the advancing direction of the vehicle 1 with the driver's head position being a reference.

Next, the controller 10 calculates a relative risk $R^{(i)}$ of each of the cautionary objects i on the basis of the travel environment information acquired in step S1 (step S6). The relative risk $R^{(i)}$ is a numerical value from 0 and 1 that represents a degree of the risk of the vehicle 1 to collide with the cautionary object i. For example, the controller 10 calculates a Time to Collision (TTC) of the cautionary object i on the basis of the position and a relative speed of the cautionary object i acquired by the outside camera 21 and the radar 22. Then, the relative risk $R^{(i)}$ is calculated by a mathematical expression that uses the TTC as a variable and is set to increase the relative risk $R^{(i)}$ as the TTC is reduced.

Next, the controller 10 calculates a predicted gazing frequency value $f_p^{(i)}$ of each of the cautionary objects i on the basis of a speed v of the vehicle 1 acquired in step S1, the observable time $T_{obs}^{(i)}$ calculated in step S5, and the relative-risk $R^{(i)}$ calculated in step $6 (step S7). The predicted gazing frequency value $f_p^{(i)}$ is calculated by the following equation that models the gazing frequency of the driver in the normal state at the object. The controller 10 accumulates the calculated predicted gazing frequency value $f_p^{(i)}$ in the memory 10b.

Here, v is the vehicle speed of the vehicle 1, and $h_1$ and $h_2$ are nonlinear functions. Based on the data on the vehicle speed, the cautionary object, and the line of sight acquired by a driving experiment using a driving simulator, the gazing frequency of the driver in the normal state is measured under various travel conditions, and a regression analysis is made by using the measured data. In this way, coefficients and constant terms of $h_1$ and $h_2$ can be determined. The coefficients and the constant terms of $h_1$ and $h_2$ that are determined in advance are stored in the memory 10b.

In general, since the driver's dynamic visual acuity is lowered as the vehicle speed v is increased, there is a tendency that finding of the cautionary object is delayed and the gazing frequency is reduced in a high-speed range. In addition, finding of the object that rapidly approaches an own vehicle, that is, the object with the high relative risk $R^{(i)}$ tends to be delayed due to a short time of presence in the driver's field of view, and thus the gazing frequency tends to be reduced. That is, the vehicle speed v and the relative risk $R^{(i)}$ each affect the gazing frequency. Furthermore, as the observable time $T_{obs}^{(i)}$ is increased, the gazing frequency at the cautionary object is increased. Accordingly, by hierarchically modeling a relationship among the vehicle speed v, the relative risk $R^{(i)}$, and the observable time $T_{obs}^{(i)}$ with respect to the gazing frequency, it is possible to predict the gazing frequency at the cautionary object i with a high degree of accuracy.

Next, the controller 10 calculates a predicted gazing time value $g_p^{(i)}$ at each of the cautionary objects i on the basis of the observable time $T_{obs}^{(i)}$ calculated in step S5 (step S8). The predicted gazing time value $g_p^{(i)}$ is calculated by the following equation that models the gazing time of the driver in the normal state at the object. The controller 10 accumulates the calculated predicted gazing time value $g_p^{(i)}$ in the memory 10b.

Here, k is a nonlinear function. A coefficient and a constant term of k can be determined by measuring the gazing time of the driver in the normal state under the various travel conditions on the basis of the data on the cautionary object and the line of sight acquired by the driving experiment using the driving simulator and by making the regression analysis using the measured data. The coefficient and the constant term of k that are determined in advance are stored in the memory 10b.

The present inventors have experimentally confirmed that, as the observable time $T_{obs}^{(i)}$ is increased, the gazing time at the cautionary object is increased. Thus, by modeling the gazing time using the observable time $T_{obs}^{(i)}$, the gazing time at the cautionary object i can be predicted with the high degree of accuracy.

Next, the controller 10 calculates abnormality levels $GF_f$, $GF_s$, $GF_u$ of the driver's state for respective types of the cautionary object on the basis of the actual measured value $f^{(i)}$ of the gazing frequency and the actual measured value $g^{(i)}$ of the gazing time, and the predicted gazing frequency value $f_p^{(i)}$ and the predicted gazing time value $g_p^{(i)}$, at each cautionary object i (step S9). $GF_f$ indicates that the cautionary object is the preceding vehicle, $GF_s$ indicates that the cautionary object is a side vehicle, and $GF_u$ indicates that the cautionary object is an unidentified object.

Here, the types of the cautionary objects in the present embodiment will be described with reference to FIG. 4. In FIG. 4, A represents the own vehicle, B represents the preceding vehicle traveling in the same lane as the own vehicle A, and C and D represent side vehicles, each of which travels ahead of the own vehicle in an adjacent lane. In addition, it is assumed that the driver gazes at the preceding vehicle B and the side vehicle C but does not gaze at the side vehicle D (for example, a time in which the driver directs his/her line of sight is less than 0.1 second). In the present embodiment, the types of these cautionary objects are classified into three types of (1) the preceding vehicle B, (2) the side vehicle C, and (3) the unidentified object D.

While a position of the preceding vehicle is identified by the image data that is acquired from the outside camera 21, a position of the side vehicle is identified by the radar 22. Thus, different systematic errors are included at the time of determining the positions and determining the gazing. Thus, when the gazing frequency and the gazing time are evaluated without distinguishing the preceding vehicle, the side vehicle, and the unidentified object from each other, the plural systematic errors are included, which lowers the estimation accuracy of the driver's state.

Accordingly, the cautionary objects are classified into three types of (1) the preceding vehicle, (2) the side vehicle, and (3) the unidentified object, and a difference between the actual measured value and the predicted value of each of the gazing frequency and the gazing time is evaluated to appropriately estimate the driver's state.

More specifically, for each of the cautionary objects i, the controller 10 acquires the actual measured value $f^{(i)}$ of the gazing frequency and the actual measured value $g^{(i)}$ of the gazing time, which are accumulated in the memory 10b in the last predetermined time (for example, 10 seconds), and the predicted gazing frequency value $f_p^{(i)}$ and the predicted gazing time value $g_p^{(i)}$, so as to calculate an abnormality level $GF_{val}^{(i)}$ for each of the cautionary objects i by the following equation. For the index of "val" of this abnormality level, "f" is used when the type of the cautionary object is the preceding vehicle, "s" is used in the case of the side vehicle, and "u" is used in the case of the unidentified object. In addition, "MA" in the following equation indicates a moving average in the last predetermined time.

In the case where there are the plural cautionary objects of the same type, the abnormality levels $GF_f$, $GF_s$, $GF_u$ of the driver's state in the last predetermined time are calculated for each type of the cautionary object by acquiring an average value of the abnormality levels $GE_{val}^{(i)}$ for each of the cautionary object i.

Next, the controller 10 calculates an n integrated abnormality level d on the basis of the abnormality levels $GF_f$, $GF_s$, $GF_u$ calculated in step S9 (step S10). For example, the controller 10 accumulates three-dimensional data with the abnormality levels $GF_f$, $GF_s$, $GF_u$ each being a variable, and calculates, as the integrated abnormality level d, the Mahalanobis distance between the latest data point of this three-dimensional data and a center of gravity (mean) of the accumulated data set.

Next, the controller 10 determines whether the integrated abnormality level d calculated in step S10 is equal to or greater than a threshold $d_{th}$ (step S11).

As a result, if the integrated abnormality level d is not equal to or greater than the threshold $d_{th}$ (step S11: NO), the controller 10 estimates that the driver's state is normal (step S12), and terminates the driver state estimation processing.

On the other hand, if the integrated abnormality level d is equal to or greater than the threshold $d_{th}$ (step S11: YES), the controller 10 estimates that the driver is in the inattentive state (step S13).

Next, the controller 10 transmits the control signal to the display 36 and the speaker 37, and causes the display 36 and the speaker 37 to output an alarm for notifying the driver that the driver is in the inattentive state (step S14). At this time, the display 36 and the speaker 37 may be made to output the image information and the audio information (line-of-sight guidance information) for guiding the driver's line of sight to the cautionary object that the driver has not visually recognized. After step S14, the controller 10 terminates the driver state estimation processing.

MODIFIED EXAMPLES

In the above-described embodiment, the description has been made that the driver's state is estimated by comparing the integrated abnormality level d with the threshold value $d_{th}$. However, instead of the integrated abnormality level d, the abnormality levels $GF_f$, $GF_s$, $GF_u$ for each type of the cautionary object may be compared with respective predetermined thresholds to estimate the driver's state.

In the above-described embodiment, the description has been made that the integrated abnormality level d is calculated by using the Mahalanobis distance. However, the integrated abnormality level d may be calculated by another calculation method. For example, the integrated abnormality level d may be acquired by normalizing and synthesizing the abnormality levels $GF_f$, $GF_s$, $GF_u$ for each type of the cautionary object.

In the above-described embodiment, the description has been made that the other vehicle is used as the cautionary object. However, the pedestrian, the obstacle, or the like may be used in addition to the other vehicle.

In addition, the predicted gazing frequency value $f_p$ (i) and the predicted gazing time value $g_p^{(i)}$ may be corrected by performing individual learning per driver.

Operation/Effects

Next, operation and effects of the driver state estimation apparatus 100 in the present embodiment described above will be described.

The controller 10 calculates the predicted gazing frequency value $f_p^{(i)}$ on the basis of the relative risk $R^{(i)}$, the observable time $T_{obs}^{(i)}$, and the speed v of the vehicle 1, calculates the predicted gazing time value $g^{(i)}$ on the basis of the observable time $T_{obs}^{(i)}$, and estimates that the driver is in the inattentive state when the driver's abnormality level d, which is calculated on the basis of the product of the difference between the actual measured value $f^{(i)}$ and the predicted value $f_p^{(i)}$ of the gazing frequency and the difference between the actual measured value $g^{(i)}$ and the predicted value $g_p^{(i)}$ of the gazing time, is equal to or greater than the predetermined threshold $d_{th}$. Thus, it is possible to predict the gazing frequency and the gazing time of the driver in the normal state with the high degree of accuracy by reflecting the influence of the travel environment on the gazing frequency and the gazing time, and it is possible to accurately estimate the driver's state on the basis of the differences of the predicted gazing frequency value and the predicted gazing time value from the actual measured value of the gazing frequency and the actual measured value of the gazing time, respectively. As a result, it is possible to accurately estimate that the driver is in the inattentive state regardless of the travel environment.

In addition, the controller 10 synthesizes the abnormality level $GF_{val}^{(i)}$, which is calculated for each type of the cautionary object, to calculate the integrated abnormality level d, and estimates that the driver is in the inattentive state when the integrated abnormality level is equal to or greater than the predetermined threshold $d_{th}$. Thus, even when the different systematic error is included in the predicted value of each of the gazing frequency and the gazing time depending on the type of the cautionary object, the driver's state can be estimated by using the abnormality level $GF_{val}^{(i)}$, which is calculated for each type of the cautionary object such that the plural systematic errors are not superimposed, and it is possible to further accurately estimate that the driver is in the inattentive state.

Furthermore, even when the different systematic error is included in the predicted value of each of the gazing frequency and the gazing time for each of the preceding vehicle, the side vehicle, and the unidentified object, the controller 10 can estimate the driver's state by using the abnormality levels $GF_f$, $GF_s$, $GF_u$, which are individually calculated for each of the preceding vehicle, the side vehicle, and the unidentified object, such that those plural systematic errors are not superimposed, and it is possible to further accurately estimate that the driver is in the inattentive state.

REFERENCE SIGNS LIST

1: vehicle
10: controller
100: driver state estimation apparatus
21: outside camera
22: radar
23: navigation system
24: positioning system
25: vehicle speed sensor
26: acceleration sensor
27: yaw rate sensor
28: steering angle sensor
29: steering torque sensor 30: accelerator sensor
31: brake sensor
32: in-vehicle camera
36: display
37: speaker

The invention claimed is:

1. A driver state estimation apparatus that estimates a state of a driver who drives a vehicle, the driver state estimation apparatus comprising:
   a camera that detects a line of sight of the driver; and
   processing circuitry configured to
   acquire travel environment information of the vehicle,
   estimate the state of the driver on a basis of the travel environment information and the line of sight of the driver,
   calculate a relative risk that represents a risk of the vehicle to collide with a cautionary object around the vehicle based on the travel environment information,
   calculate an observable time that represents a time in which the cautionary object has existed at a position where the driver can gaze at the cautionary object, based on the travel environment information,
   calculate a predicted gazing frequency value that represents a number of times the driver gazes at the cautionary object during a predetermined observation time based on the relative risk, the observable time, and a speed of the vehicle,
   calculate a predicted gazing time value in which the driver continuously gazes at the cautionary object during the predetermined observation time based on the observable time,
   acquire an actual measured value of each of a gazing frequency and a gazing time of the driver gazing at the cautionary object during the predetermined observation time based on the travel environment information and the line of sight of the driver,
   calculate an abnormality level of the driver based on a product of a difference between an actual measured value and the predicted value of the gazing frequency and a difference between an actual measured value and the predicted value of the gazing time, and
   estimate that the driver is in an inattentive state in a case where the abnormality level is equal to or greater than a predetermined threshold.

2. The driver state estimation apparatus according to claim 1, wherein
   the processing circuitry is configured to:
      identify a type of the cautionary object based on the travel environment information;
      calculate the abnormality level for each type of the cautionary object;
      calculate an integrated abnormality level by synthesizing the abnormality levels, each of which is calculated for each type of the cautionary object; and
      estimate that the driver is in the inattentive state in a case where the integrated abnormality level is equal to or greater than a predetermined threshold.

3. The driver state estimation apparatus according to claim 2, wherein
   the types of the cautionary objects include a preceding vehicle, a side vehicle, and an unidentified object.

4. The driver state estimation apparatus according to claim 1, wherein the processing circuitry is configured to output an alarm when the driver is estimated to be in the inattentive state.

5. The driver state estimation apparatus according to claim 4, wherein the alarm includes line-of-sight guidance information for guiding the driver's line of sight to the cautionary object.

6. The driver state estimation apparatus according to claim 1, wherein the processing circuitry is configured to
   calculate the relative risk based on a Time to Collision (TTC) with the cautionary object.

7. The driver state estimation apparatus according to claim 1, wherein the observable time is calculated based on whether the cautionary object exists within a predetermined angular range from an advancing direction of the vehicle.

8. The driver state estimation apparatus according to claim 1, wherein the processing circuitry is configured to
   calculate the predicted gazing frequency value using a nonlinear function that models the gazing frequency based on vehicle speed.

9. The driver state estimation apparatus according to claim 1, wherein the processing circuitry is configured to
   determine that the driver gazes at the cautionary object when the line of sight overlaps with a direction of the cautionary object for at least a predetermined time.

10. A method for estimating a state of a driver who drives a vehicle, the method comprising:
   detecting, with a camera, a line of sight of the driver;
   acquiring travel environment information of the vehicle;
   calculating a relative risk that represents a risk of the vehicle to collide with a cautionary object around the vehicle based on the travel environment information;
   calculating an observable time that represents a time in which the cautionary object has existed at a position where the driver can gaze at the cautionary object, based on the travel environment information;
   calculating a predicted gazing frequency value that represents a number of times the driver gazes at the cautionary object during a predetermined observation time based on the relative risk, the observable time, and a speed of the vehicle; calculating a predicted gazing time value in which the driver continuously gazes at the cautionary object during the predetermined observation time based on the observable time;
   acquiring an actual measured value of each of a gazing frequency and a gazing time of the driver gazing at the cautionary object during the predetermined observation time based on the travel environment information and the line of sight of the driver;
   calculating an abnormality level of the driver based on a product of a difference between an actual measured value and the predicted value of the gazing frequency and a difference between an actual measured value and the predicted value of the gazing time; and
   estimating that the driver is in an inattentive state in a case where the abnormality level is equal to or greater than a predetermined threshold.

11. The method according to claim 10, further comprising:
   identifying a type of the cautionary object based on the travel environment information;
   calculating the abnormality level for each type of the cautionary object;
   calculating an integrated abnormality level by synthesizing the abnormality levels, each of which is calculated for each type of the cautionary object; and
   estimating that the driver is in the inattentive state in a case where the integrated abnormality level is equal to or greater than a predetermined threshold.

12. The method according to claim 11, wherein the types of the cautionary objects include a preceding vehicle, a side vehicle, and an unidentified object.

13. The method according to claim 10, further comprising:

outputting an alarm when the driver is estimated to be in the inattentive state.

14. The method according to claim 13, wherein the alarm includes line-of-sight guidance information for guiding the driver's line of sight to the cautionary object.

15. The method according to claim 10, wherein calculating the relative risk comprises calculating a Time to Collision (TTC) with the cautionary object.

16. A non-transitory computer-readable medium storing instructions that, when executed by processing circuitry, cause the processing circuitry to perform a method for estimating a state of a driver who drives a vehicle, the method comprising:

acquiring line of sight information from a camera that detects a line of sight of the driver;

acquiring travel environment information of the vehicle;

estimating the state of the driver on a basis of the travel environment information and the line of sight of the driver by: calculating a relative risk that represents a risk of the vehicle to collide with a cautionary object around the vehicle based on the travel environment information;

calculating an observable time that represents a time in which the cautionary object has existed at a position where the driver can gaze at the cautionary object, based on the travel environment information;

calculating a predicted gazing frequency value that represents a number of times the driver gazes at the cautionary object during a predetermined observation time based on the relative risk, the observable time, and a speed of the vehicle; calculating a predicted gazing time value in which the driver continuously gazes at the cautionary object during the predetermined observation time based on the observable time;

acquiring an actual measured value of each of a gazing frequency and a gazing time of the driver gazing at the cautionary object during the predetermined observation time based on the travel environment information and the line of sight of the driver; calculating an abnormality level of the driver based on a product of a difference between an actual measured value and the predicted value of the gazing frequency and a difference between an actual measured value and the predicted value of the gazing time; and estimating that the driver is in an inattentive state in a case where the abnormality level is equal to or greater than a predetermined threshold.

17. The non-transitory computer-readable medium according to claim 16, further comprising:

outputting an alarm when the driver is estimated to be in the inattentive state.

18. The non-transitory computer-readable medium according to claim 17, wherein the alarm includes line-of-sight guidance information for guiding the driver's line of sight to the cautionary object.

19. The non-transitory computer-readable medium according to claim 16, wherein calculating the relative risk comprises calculating a Time to Collision (TTC) with the cautionary object.

20. The non-transitory computer-readable medium according to claim 16, further comprising:

determining that the driver gazes at the cautionary object when the line of sight overlaps with a direction of the cautionary object for at least a predetermined time.

* * * * *